Sept. 8, 1959 B. O. BORDENKIRCHER ET AL 2,903,272
AIR SPRING CONTROL
Filed Nov. 13, 1957 2 Sheets-Sheet 1
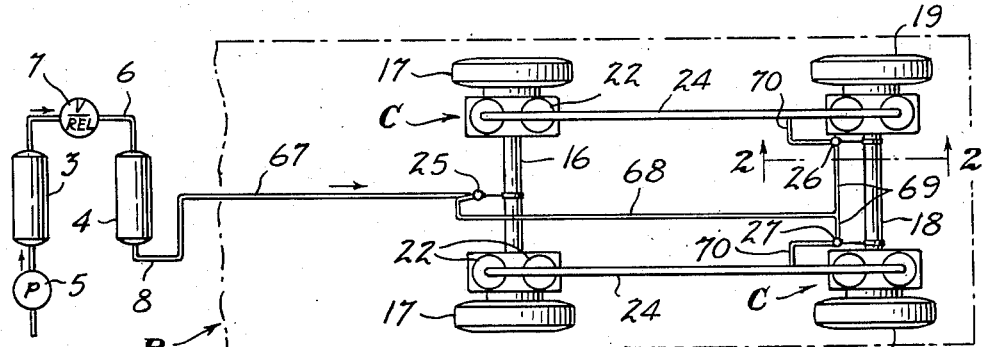
Fig. 1
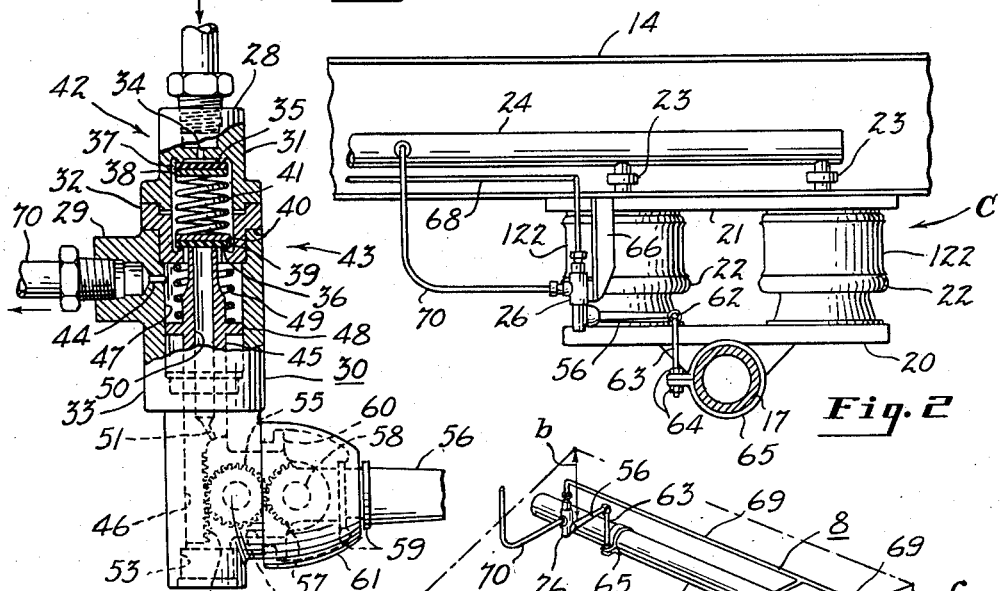
Fig. 2
Fig. 3
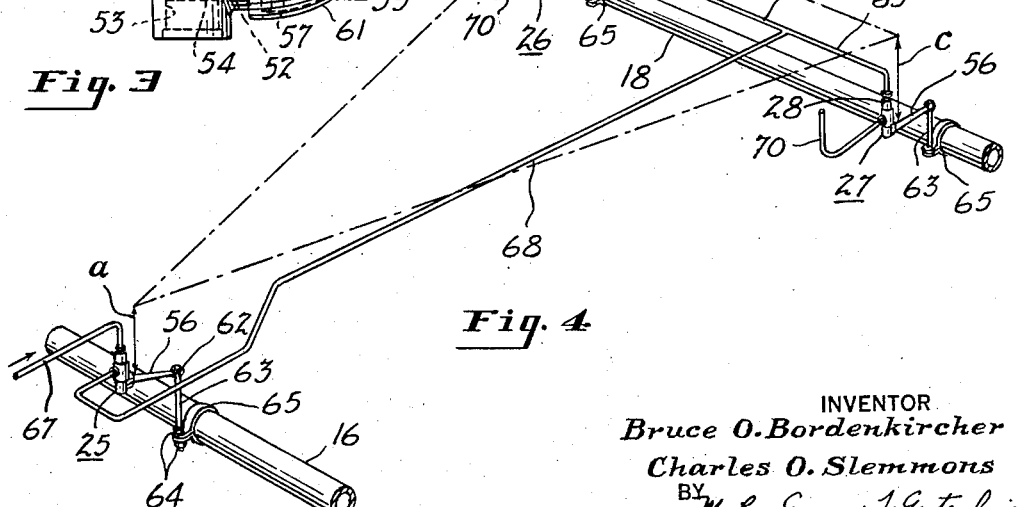
Fig. 4
INVENTOR.
Bruce O. Bordenkircher
Charles O. Slemmons
BY McCoy, Greene + De Grootenhuis
ATTORNEYS INVENTOR
Bruce O. Bordenkircher
Charles O. Slemmons
BY
ATTORNEYS

2,903,272
AIR SPRING CONTROL

Bruce O. Bordenkircher, Cuyahoga Falls, and Charles O. Slemmons, Akron, Ohio, assignors to The General Tire & Rubber Company, Akron, Ohio, a corporation of Ohio Application November 13, 1957, Serial No. 696,249

5 Claims. (Cl. 280—124)

The present invention relates to pneumatic suspension systems for trucks and more particularly to the control of the supply of air to and the exhaust of air from the pneumatic cushions of a trailer or semi-trailer.

Heretofore, there has been a tendency, with trailers having widely spaced axles, to shift an unduly large portion of the load to the rear wheels. The problem becomes very serious on semi-trailers where the fifth wheel of the tractor or towing vehicle is unusually high.

According to the present invention an air control system is provided which distributes the load evenly, between the front and rear axles of the trailer and which prevents excessive upward movement of the trailer frame with respect to each axle so as to protect the pneumatic cushions. One suspension unit is normally provided at each end of each trailer axle. The present invention provides passage means for establishing communication between the front and rear suspension units on each side of the trailer frame and valve means responsive to movement between the axles and the trailer frame for controlling the supply of air to the suspension units. Two valves are preferably provided at the rear axle to control the air supply for the rear wheels and one valve is provided at the front axle that is connected in series with the other valves and that is normally open. Said one valve shuts off the supply of air to all the suspension units when the distance between the front axle and the trailer frame becomes excessive but normally has little effect on the suspension units since said units are normally controlled almost entirely by the other valves. This simple valve arrangement provides an exceptional control system for the vehicle suspension.

An object of the present invention is to provide an improved suspension system for semi-trailers.

A further object of the invention is to provide a simple inexpensive vehicle suspension system which is reliable and which minimizes the forces transmitted from the vehicle to the road.

Other objects, uses and advantages of the invention will occur to those skilled in the art from the following description and claims and from the drawings, in which:

Figure 1 is a fragmentary top view on a reduced scale with parts omitted and parts shown, schematically illustrating a semi-trailer constructed according to the present invenion;

Figure 2 is a fragmentary vertical sectional view with parts omitted taken substantially on the line 2—2 of Fig. 1 and on a larger scale;

Figure 3 is a side elevational view drawn substantially to scale with parts broken away and shown in section illustrating one of the valves employed in the suspension system;

Figure 4 is a fragmentary perspective view on a reduced scale showing the arrangement of the valves in the control system, the normal horizontal position of the trailer frame being illustrated in dot-dash lines to show the normal valve settings.

Figure 5:
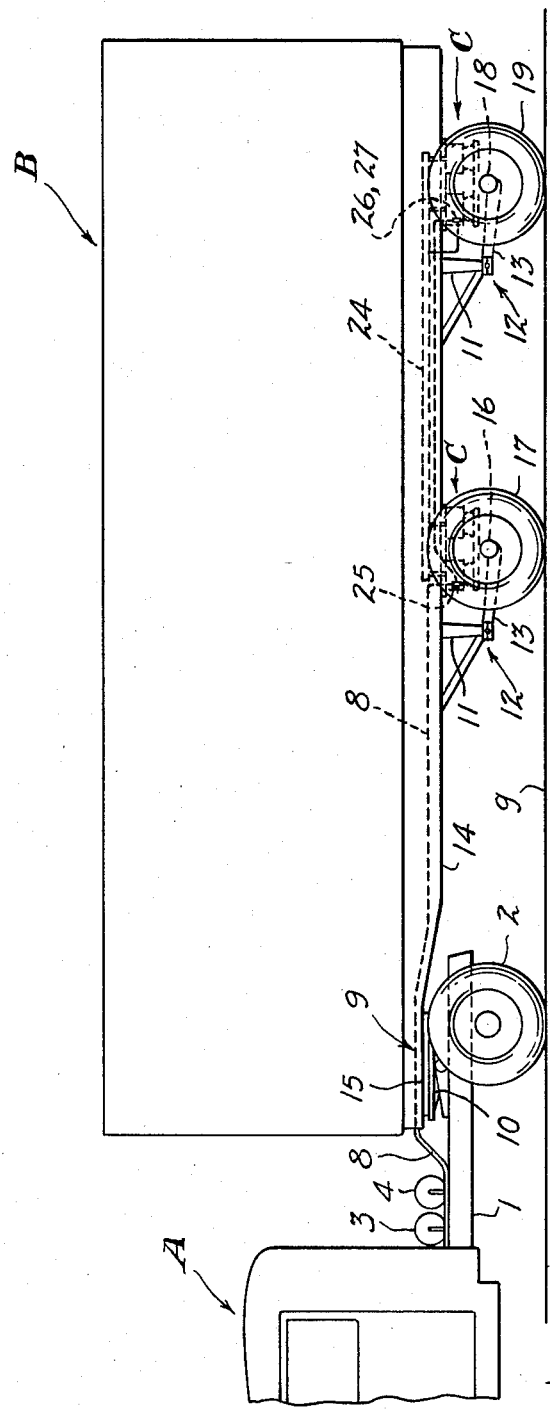
Figure 5 is a fragmentary side elevational view of the tractor and the semi-trailer of Figs. 1 to 4.

Referring more particularly to the drawings in which like parts are identified by the same numerals throughout the several views, Figure 5 shows a truck having a conventional tractor or towing vehicle A, a semi-trailer B, and a suspension unit C for each wheel of the trailer. The tractor has a frame 1 supported by wheels 2 and carries a pair of air tanks 3 and 4, an air pump 5, and associated means including a connecting conduit 6 having a 65 pound relief valve 7 and a supply conduit 8 leading to the trailer. Since the air brakes for the tractor A are supplied with air from the tank 3, it is not safe to allow unrestricted flow of air from the tank 3 to the trailer B. The relief valve 7 insures safe braking by admitting air to the tank 4 from the tank 3 only when the pressure exceeds 65 pounds per square inch. A conventional fifth-wheel assembly is provided at the rear of the tractor A including a lower fifth-wheel turnplate 10 mounted on the tractor frame 1.

The trailer B has a main frame 14 with an upper fifth-wheel turnplate 15 mounted thereon, said turnplate having a conventional swivel connection to the lower turnplate 10. The suspension system for the trailer B includes a conventional transversely extending front axle 16 having wheels 17 rotatably mounted at its opposite ends and a rear axle 18 parallel to the axle 16 and having wheels 19 rotatably mounted at its opposite ends directly behind the wheels 17. The frame 14 is supported above the axles by the four suspension units C whose lower plates 20 are connected to the axles 16 and 18 in the manner indicated in Fig. 2. A bracket 11 is rigidly connected to the trailer frame forwardly of each axle to provide a support for a yieldable connection 12 which may be a universal connection of the type shown in U.S. Patent No. 2,742,302. A drag bar or radius rod 13 is rigidly connected to each of the trailer axles and is pivotally connected to the frame by the connection 12.

Each of the suspension units C comprises a lower plate 20 connected to the axle, an upper plate 21 rigidly connected to the frame and a pair of inflatable pneumatic cushions or air springs 22 extending between the upper and lower plates as shown in Fig. 2. The air springs 22 may be constructed in various ways and are shown herein with an outer floating metal sleeve 122, springs of this type being shown in more detail in Belgian Patent No. 559,257 which claims priority based on a copending U.S. application filed December 10, 1956.

The inlet connections 23 leading to the eight air springs 22 are connected to two conduits 24 located at the opposite sides of the vehicle as indicated in Figs. 1 and 2 and rigidly mounted on the frame 14. Each of the conduits 24 extends between the front and rear suspension units C and provides passage means for establishing communication between said units to permit free flow of air therebetween. Because of this arrangement the rear axle assumes only half of the load.

The flow of air to and from the suspension units at both sides of the trailer is controlled by means including three identical valve assemblies 25, 26 and 27. Each valve assembly has an inlet 28 and an outlet 29 and comprises a valve body 30 having an annular cup-shaped upper portion 31, a small annular intermediate portion 32, and a larger lower portion 33. The upper portion is shaped to provide a small opening 34 and an annular valve seat 35 which normally engages the flat top face of a rubber or plastic valve member 37. The member 37 is yieldably pressed gainst the valve seat by a helical spring 41 and an upper metal disc 38 so as to provide a one-way check valve 42 at the upper inlet end of the valve assembly.

The intermediate portion 32 is shaped to provide an annular valve seat 36 which engages the flat bottom surface of a rubber valve member 39. The latter member is biased downwardly by the spring 41 and the metal disc 40, which is interposed between said spring and said member. The lower portion 33 of the valve body 30 is shaped to provide a small opening 44 which establishes communication between the control valve 43 and the outlet passage at 29. A hollow control plunger 45 is provided to raise the valve disc 39, said plunger sliding vertically in the bore 36 and the counterbore 47 of the valve body portion 33. The plunger has an enlarged cylindrical piston-like portion 48 which fits in the cylindrical bore 36, a helical spring 49 being interposed between the portion 48 and the bottom end of the body portion 32 to bias the plunger downwardly. The flat upper face of the valve plunger 45 is adapted to move into engagement with the valve disc 39 to prevent the flow of air through the internal passage 50 of the plunger and the vent passage 51 of the plunger to the open chamber 52 of the valve body. The pressure within said chamber is atmospheric pressure since the valve body 30 has an opening 53 in communication with the vent passage 51 and the chamber 52.

The elements 36, 39 and 46 forming the control valve 43 at the intermediate portion 32 serve to control the flow of air to and the exhaust of air from the chamber formed by the bore 46. Upward movement of the plunger 45 in opposition to the spring 49 is provided for by the rack portion 54 of the plunger, the pinion gear 55 and the control arm 56 as is apparent from Fig. 3. The arm 56 is shaped to provide a gear sector 57 having teeth which mesh with those of the pinion gear to effect rotation of the pinion gear whenever the arm is swung about its pivot 58. The teeth of the pinion in turn mesh with the teeth of the rack 46 to effect vertical movement of the plunger 45 in response to vertical swinging movement of the control arm 56. The arm has a pair of flanges 59 which, with the flange 60 of the valve body, serve to locate the flexible rubber cover 61 and has a pivot pin 62 at its free end to provide a pivotal connection between the arm and the vertical rod 63. The rod 63 of each valve assembly is threaded at its lower end to receive two adjusting nuts 64 which rigidly connect the rod to a clamp 65 and thereby to the axle. The rod 63 therefore moves vertically in unison with the end portion of the trailer axle to which it is connected, and the control arm 56 swings in response to relative vertical movement between the axle and the valve body 30. In the trailer shown herein each valve body 30 is rigidly connected to a bracket 66 extending downwardly from the trailer frame and moves in unison with the frame.

Figure 4 illustrates how the valve assemblies 25, 26 and 27 are arranged to provide the control system of the present invention. The air from the supply tanks 3 and 4 is conducted from the tractor A to the trailer B by the inlet portion 67 of the supply conduit 8 which is connected to the inlet 28 of the valve assembly 25 above the front axle 16. The connecting portion 68 of the supply conduit is connected to the outlet 29 of the valve assembly 25 and extends to a point near the rear axle 18 wherein the supply conduit divides to form two laterally extending branch conduits 69. The branch conduits are connected to the inlets 28 of the valves 26 and 27 and outlet conduits 70 are provided for establishing communication between the valves and the side conduits 24. Each conduit 70 extends between the conduit 24 on that side of the vehicle and the outlet 29 of the associated valve assembly as shown in Fig. 2.

The opening and closing of the valves 25, 26 and 27 may be predetermined by adjusting the effective length of each rod 63 and/or by adjusting the position of each valve body on the trailer frame. According to the present invention, the valves are adjusted so that, when the trailer B is mounted on a normal tractor A and in a normal position on a flat horizontal roadway, the valves 43 of the valve assemblies 26 and 27 are in substantially the same (closed) positions and the valve 43 of the valve assembly 25 is in an open position, wherein the valve body 30 must move about ½ to 2 inches and preferably about one inch upwardly to effect closing of the valve 43.

As herein shown, the valve assemblies 25, 26 and 27 are the same and the arms 56 and rods 63 have the same effective length. When the trailer B is riding on a flat horizontal ground surface g so that the axles 16 and 17 are parallel and at the same elevation, the position of the valve assembly 25 on the trailer frame 14 relative to the axles is preferably one inch higher than the positions of the valve assemblies 26 and 27, the latter assemblies being at the same elevation.

This is indicated in Fig. 4 which shows three dot-dash lines located in a horizontal plane which intersect to form the triangle shown. Since the trailer frame 14 is flat and normally horizontal, this dot-dash line also indicates the normal position of the trailer frame 14. The distance a, shown in Fig. 4 as the normal distance from the arm 56 of the valve assembly 25 to the horizontal plane shown in dot-dash lines, is preferably one inch less than the corresponding distance b or c indicated for the valve assembly 26 or 27. Distances b and c are equal. The valve assembly 25 is, therefore, normally in an open position so that air flows freely from the tanks 3 and 4 to the valve assemblies 25 and 26.

In normal operation the valve assemblies 26 and 27 control the height of the trailer frame to within a very small fraction of an inch. If either rear wheel 19 strikes a bump so as to elevate the axle above its normal position relative to the trailer frame, the valve 43 of the associated valve assembly 26 or 27 opens to admit more air to the pneumatic cushion units on that side of the vehicle. Where the end of the axle connected to the valve assembly 26, for example, drops relative to the trailer frame, the valve 43 of the assembly 26 moves to the exhaust position, the plunger 45 moving out of contact with the disc 39 to permit flow of air from the units C through the conduit 70 and the passage 50 and out through the vent opening 51.

Each time air is admitted to a rear cushioning unit C, the air pressure increases at the corresponding front cushioning unit. The front end of the trailer tends to be raised every time the rear end is raised. Under normal operation the height of the front of the trailer will be controlled mainly by the valve assemblies 26 and 27 since the valve 43 of the assembly 25 will be open most of the time. However, if the height of the trailer frame 14 relative to the front axle 16 becomes excessive, the disc 39 of the assembly 25 will be lowered into engagement with the seat 36 to shut off the air supply to the cushioning units.

This prevents excessive extension of the front cushioning units C which might occur if the valve assembly 25 were omitted and the front of the trailer were elevated. Such a condition could occur, for example, if the lower fifth wheel 10 of the towing vehicle or tractor A were at an unusually high elevation due to the construction of the tractor or the shape of the ground. A similar condition occurs when the trailer is backed up an incline or is parked on an incline.

In any case where a substantial portion of the load is shifted from the tractor wheels to the fifth wheel turnplate, the air supply should be cut off to prevent damage to the front cushioning units. The valve assembly 25 takes care of this automatically by shutting off the air flow to the suspension system to limit the elevation of the front axle 16.

The vent passage 51 of the valve assemblies 26 and 27 are important since they are needed to remove excess air from the cushioning units. The vent passage 51 of the valve assembly 25, however, is not important since the amount of air flowing out of this passage when the assembly 25 is in the exhaust position is negligible, the check valves 42 of the assemblies 26 and 27 preventing exhaust of air from the suspension units C and the valve member 39 preventing exhaust of air from the conduit portion 67 when the assembly 25 is in said exhaust position. The exhaust portion of the valve assembly 25 may, therefore, be omitted.

It is to be understood that the above description is by way of illustration, rather than limitation, and that, in accordance with the provisions of the patent statutes, variations and modifications of the specific apparatus disclosed herein may be made without departing from the spirit of the invention.

Having described our invention, we claim:

1. In combination with a tractor having a trailer-supporting frame and a lower fifth wheel turnplate, a semi-trailer having a main frame and a wheel assembly for supporting said main frame, said wheel assembly including independent transverse front and rear axles having road-engaging wheels mounted at their ends and inflatable air suspension units interposed between said axles and said main frame, one of said units being provided at each end of each trailer axle, passage means carried by said main frame for establishing communication between the front and rear air suspension units on each side of the trailer frame so as to permit flow of air between the suspension units, a pair of valves on opposite sides of the trailer for controlling the flow of air to and the the exhaust of air from the air suspension units, one of said valves controlling the air supply to the units at one side of the trailer and the other valve controlling the air supply to the units at the other side of the vehicle, each of said valves being actuated in response to relative upward and downward movement between said main frame and one of said axles, means for supplying air under pressure through said valves to said air suspension units, and valve means responsive to the position of the other of said axles for controlling the flow of air through the air supplying means to said valves, said valve means being in an open position admitting air to one of said valves when said tractor and said trailer are at rest on a flat horizontal roadway and said valves are in their closed positions, about ½ to 2 inches upward movement of the frame relative to said other of said axles causing movement of said valve means out of said last-named open position to a closed position, whereby said valve means remains open most of the time during travel of said trailer.

2. In combination with a tractor having a trailer-supporting frame and a lower fifth wheel turnplate, a semi-trailer having a main frame and a wheel assembly for supporting said main frame, said wheel assembly including independent transverse front and rear axles having road-engaging wheels mounted at their ends and inflatable air suspension units interposed between said axles and said main frame, one of said units being provided at each end of each trailer axle, passage means carried by said main frame for establishing communication between the front and rear air suspension units on each side of the trailer frame so as to permit flow of air between the suspension units, a pair of valves on opposite sides of the trailer for controlling the flow of air to and the exhaust of air from the air suspension units, one of said valves controlling the air supply to the units at one side of the trailer and the other valve controlling the air supply to the units at the other side of the vehicle, each of said valves being actuated in response to relative upward and downward movement between said main frame and one of said axles, means for supplying air under pressure through said valves to said air suspension units, and valve means responsive to the position of the other of said axles for controlling the flow of air through the air supplying means to said valves, said valves moving to an open position to supply more air to said units when the height of the main frame relative to one axle is less than a predetermined amount and moving to an exhaust position when said height is greater than said predetermined amount so as to remove air from said units, said valve means discontinuing the supply of air to said valves when the height of said main frame relative to the other axle is slightly greater than said predetermined amount.

3. In combination with a tractor having a trailer-supporting frame and a lower fifth wheel turnplate, a semi-trailer having a main frame and a wheel assembly for supporting said main frame, said wheel assembly including independent transverse front and rear axles having road-engaging wheels mounted at their ends and inflatable air suspension units interposed between said axles and said main frame, one of said units being provided at each end of each trailer axle, passage means carried by said main frame for establishing communication between the front and rear air suspension units on each side of the trailer frame so as to permit flow of air between the suspension units, a source of air under pressure carried by said tractor, a supply passage leading from said source to the air suspension units, valve means responsive to the movement of the rear axle relative to said main frame for controlling the flow of air to said units and for maintaining the main frame a substantially predetermined distance above said rear axle, and valve means in said supply passage responsive to the movement of the front axle and connected in series with said first named valve means between the latter valve means and said source for shutting off the flow through the supply passage whenever the distance between the front axle and the main frame becomes excessive.

4. An air control system for a trailer having a main frame, a pair of independently movable tandem axles supporting said frame, wheels at the opposite ends of said axles and at the opposite sides of the trailer, and air springs interposed between said axles and said frame yieldingly to support the frame; one of said air springs being connected between each end portion of each axle and said frame, means providing air passages between the air springs of different axles so that the springs of both axles are always subjected to a substantial air pressure, means for supplying air under pressure to said air springs including a first valve member responsive to the height of said frame relative to one axle for controlling the supply of air to the air springs, a second normally open valve member responsive to the height of said frame and relative to the other axle for controlling the supply of air to and the exhaust of air from the air springs, said valve members being connected in series, and a check valve between said valve members.

5. In a trailer having independent front and rear axles, wheels mounted on the ends of said axles, a main frame, and inflatable air suspension units mounted on the opposite end portions of each axle between the axle and the frame, the improvment which comprises a passage on each side of the frame connecting the air suspension units on that side of the frame for flow of air therebetween, a source of air under pressure, a valve near each end of the rear axle having a first position wherein air from said source is admitted to the air suspension unit at said last-named end and a second position wherein the air is exhausted from said last-named unit to atmosphere, each of the two valves being moved from said first to said second position in response to upward movement of said frame relative to the nearest end of said rear axle so as to maintain a predetermined distance between the rear axle and the frame, normally open valve means for supplying air from said source to said valves and for cutting off the supply of air automatically in response to elevation of the frame beyond a predetermined height relative to the front axle, and means comprising a check valve interposed between said valve means and said valves for preventing flow of air in a direction from said valves to said valve means while permitting flow in the opposite direction, said valves exhausting to atmosphere independently of said valve means and providing the sole means for removing air from the air suspension units of both axles.

References Cited in the file of this patent

UNITED STATES PATENTS

| | | |
|---|---|---|
| 1,721,732 | Hawkins | July 23, 1929 |
| 2,733,931 | Reid | Feb. 7, 1956 |